(12) United States Patent
Takenaka et al.

(10) Patent No.: US 11,099,347 B2
(45) Date of Patent: Aug. 24, 2021

(54) LENS MODULE FOR IMAGING DEVICE, AND METHOD FOR PRODUCING LENS MODULE

(71) Applicant: DAICEL CORPORATION, Osaka (JP)

(72) Inventors: Hiroki Takenaka, Himeji (JP); Hiromi Honma, Himeji (JP)

(73) Assignee: DAICEL CORPORATION, Osaka (JP)

( * ) Notice: Subject to any disclaimer, the term of this patent is extended or adjusted under 35 U.S.C. 154(b) by 215 days.

(21) Appl. No.: 16/465,042

(22) PCT Filed: Oct. 11, 2017

(86) PCT No.: PCT/JP2017/036729
§ 371 (c)(1),
(2) Date: Jul. 30, 2019

(87) PCT Pub. No.: WO2018/100893
PCT Pub. Date: Jun. 7, 2018

(65) Prior Publication Data
US 2019/0384030 A1 Dec. 19, 2019

(30) Foreign Application Priority Data
Nov. 30, 2016 (JP) .............................. JP2016-232080

(51) Int. Cl.
*G02B 7/02* (2021.01)
*G03B 17/12* (2021.01)
(52) U.S. Cl.
CPC ............... *G02B 7/02* (2013.01); *G03B 17/12* (2013.01)
(58) Field of Classification Search
CPC .......... G02B 7/02; G02B 7/028; G02B 7/025; G02B 7/021; G03B 17/12; H04N 5/225
See application file for complete search history.

(56) References Cited

U.S. PATENT DOCUMENTS 7,345,832 B2  3/2008 Shibuya et al.
7,576,061 B2  8/2009 Szeto et al.
(Continued)

FOREIGN PATENT DOCUMENTS

JP  2003-32525 A  1/2003
JP  2003-46825 A  2/2003
(Continued)

OTHER PUBLICATIONS

Machine translation of WO2011010510 (Year: 2011).*
(Continued)

*Primary Examiner* — Darryl J Collins
*Assistant Examiner* — Matthew Y Lee
(74) *Attorney, Agent, or Firm* — Birch, Stewart, Kolasch & Birch, LLP

(57) ABSTRACT

The imaging-device lens module includes a lens and a spacer. The lens includes a functioning portion, a non-functioning portion, and a support. The non-functioning portion is disposed around the periphery of, and is integral with, the functioning portion. The support is integral with the non-the functioning portion and supports the lens. The spacer has a flat top face, and the support has a flat bottom face. The spacer is bonded at the top face to the bottom face to support the lens. The top face has a width B, and the bottom face has a width A, where B is greater than A. The support has a height L1, the spacer has a height L2, and the functioning portion has a diameter D, where the total of L1 and L2 is greater than D, and where the diameter D is equal to or greater than the height L1.

17 Claims, 4 Drawing Sheets

(56) References Cited

U.S. PATENT DOCUMENTS

| | | | |
|---|---|---|---|
| 7,718,620 B2 | 5/2010 | Szeto et al. | |
| 8,404,646 B2 | 3/2013 | Schiller et al. | |
| 8,957,030 B2 | 2/2015 | Szeto et al. | |
| 9,065,991 B2 | 6/2015 | Galstian et al. | |
| 9,784,941 B2 | 10/2017 | Takama et al. | |
| 10,274,695 B2 | 4/2019 | Takama et al. | |
| 2002/0167605 A1 | 11/2002 | Akimoto et al. | |
| 2004/0248808 A1 | 12/2004 | Szeto et al. | |
| 2006/0114579 A1 | 6/2006 | Shibuya et al. | |
| 2007/0027087 A1 | 2/2007 | Szeto et al. | |
| 2010/0190718 A1 | 7/2010 | Schiller et al. | |
| 2010/0224948 A1 | 9/2010 | Takeuchi et al. | |
| 2012/0021970 A1 | 1/2012 | Schiller et al. | |
| 2012/0200946 A1* | 8/2012 | Wippermann | G02B 7/025 359/811 |
| 2013/0003199 A1* | 1/2013 | Jeong | G02B 13/003 359/819 |
| 2013/0244957 A1 | 9/2013 | Szeto et al. | |
| 2015/0333094 A1 | 11/2015 | Wan et al. | |
| 2015/0359838 A1 | 12/2015 | Szeto et al. | |
| 2016/0161701 A1 | 6/2016 | Takama et al. | |
| 2017/0363835 A1 | 12/2017 | Takama et al. | |

FOREIGN PATENT DOCUMENTS

| | | | |
|---|---|---|---|
| JP | 2006-178388 A | 7/2006 | |
| JP | 2006-313185 A | 11/2006 | |
| JP | 2010-16173 A | 1/2010 | |
| JP | 2010-266664 A | 11/2010 | |
| JP | 2015-22127 A | 2/2015 | |
| JP | 2015-180693 A | 10/2015 | |
| WO | WO-2011010510 A1 * | 1/2011 | ............ G02B 7/022 |
| WO | WO 2011/010510 A1 | 7/2011 | |

OTHER PUBLICATIONS

International Preliminary Report on Patentability and the English translation of the Written Opinion of the International Searching Authority for International Application No. PCT/JP2017/036729, dated Jun. 13, 2019.

International Search Report for International Application No. PCT/JP2017/036729 dated Jan. 16, 2018, with English Translation.

Extended European Search Report for European Application No. 17876249.8, dated Jul. 30, 2020.

* cited by examiner

[FIG. 1]
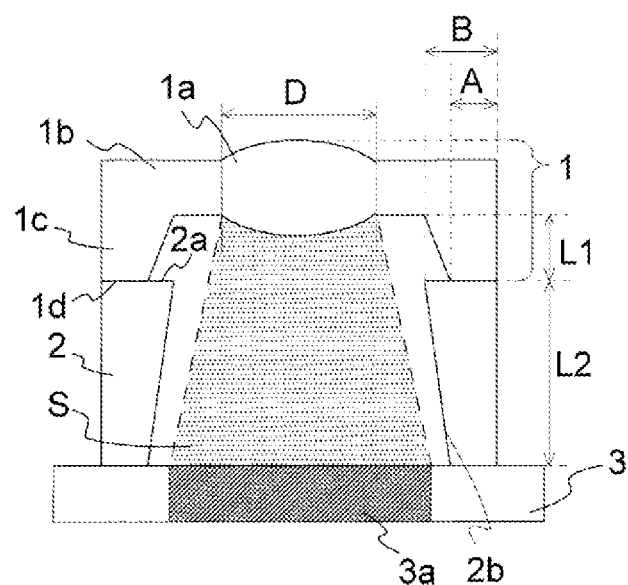
[FIG. 2]
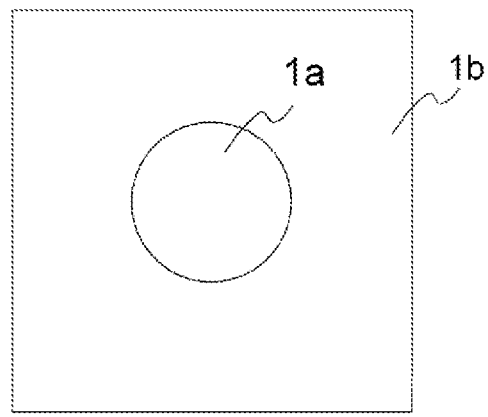

[FIG. 3]
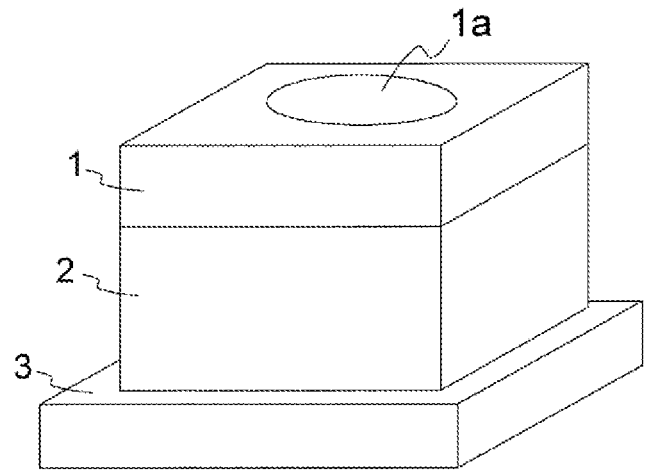
[FIG. 4]
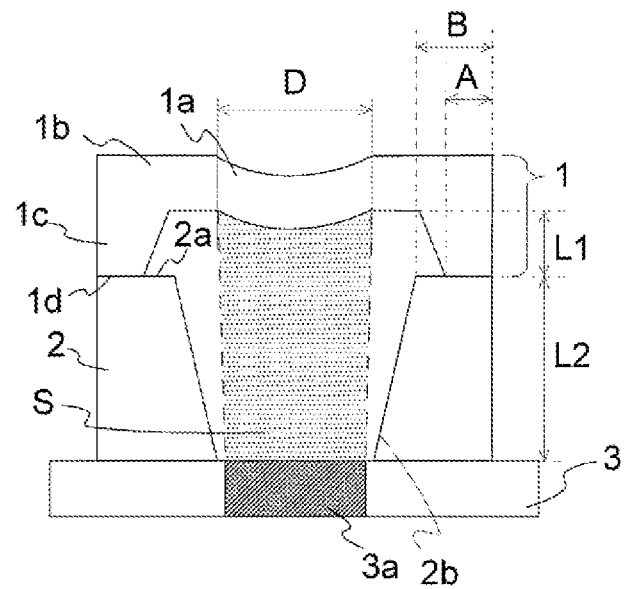

[FIG. 5]
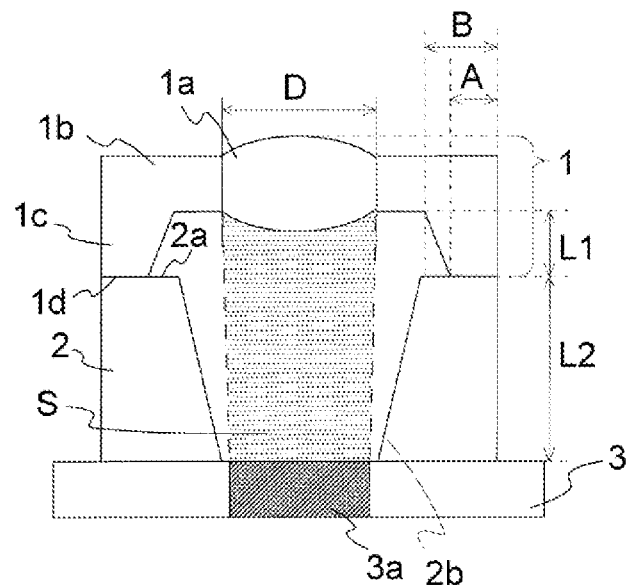
[FIG. 6]
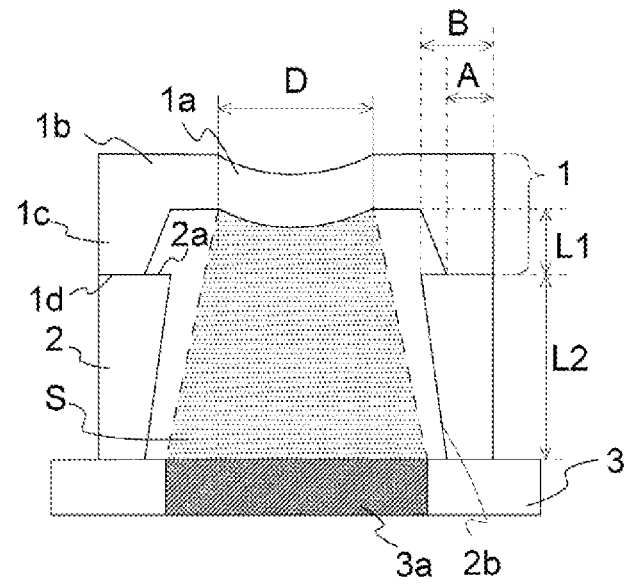

[FIG. 7]
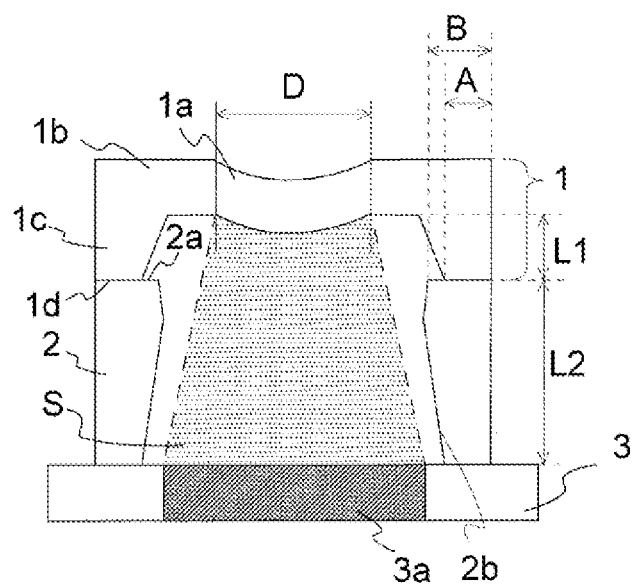

LENS MODULE FOR IMAGING DEVICE, AND METHOD FOR PRODUCING LENS MODULE

TECHNICAL FIELD

The present invention relates to a lens module for imaging devices and a method for producing the lens module. This application claims priority to Japanese Patent Application No. 2016-232080, filed Nov. 30, 2016 in Japan, the entire contents of which are incorporated herein by reference.

BACKGROUND ART

Compact, low-profile imaging devices (image pickup devices) have been incorporated into portable electronic terminals such as cellular phones, smartphones, game equipment, and tablet computers. Such imaging devices are equipped with lens modules each including a photodetector, and a lens for forming a subject image on the photodetector.

A known example of lens modules for use in imaging devices is one in an imaging unit as follows (see Patent Literature (PTL) 1). This imaging unit includes a lens module and a sensor module. The lens module includes a substrate and a lens unit integrally molded with the substrate. The sensor module includes a semiconductor substrate, and a solid-state imager disposed on the semiconductor substrate. The substrate of the lens module and the semiconductor substrate of the sensor module are formed into approximately rectangular shapes in plan view, so that the two have approximately the same shapes.

Another known example is an imaging device as follows (see PTL 2). This imaging device includes a base board (substrate), an imager, and an optical element. The imager is disposed on the substrate and is equipped with a photoelectric transducer. The optical element includes a lens unit, a leg section (support), and a contact surface. The lens unit forms a subject image on the photoelectric transducer. The support is integral with and supports the lens unit. The contact surface is in contact with the imager. The contact surface of the optical element is in direct contact only with the peripheral surface of the imager, or, when the peripheral surface of the imager is provided with a surface member, is in contact only with the peripheral surface or the surface member.

Yet another known example is a lens module as follows (see PTL 3). This lens module includes a lens and a mounting support. The lens forms an image of incident light onto an imaging area of an imager. The mounting support is integral with the lens unit and houses the imager inside thereof. The mounting support is in an angle to the optical axis of the lens.

There is also known a solid-state imaging device (see PTL 4). This solid-state imaging device includes a camera circuit board and an optical device unit. The optical device unit is mounted to the circuit board at such a position as to allow an imager to form an image. The camera circuit board includes a main body circuit board, and the imager coupled to the main body circuit board. The optical device unit includes a holder and a main plate. The holder holds a lens inside thereof and has a male screw at an outer periphery thereof. The main plate has a holder receiver provided with a female screw corresponding to the male screw and is coupled to the camera circuit board.

In addition, there is also known an optical layer stack (see PTL 5). This optical layer stack includes a first layer, a second layer, a first spacer part associated with the first layer, and a second spacer part associated with the second layer, where the first layer and/or the second layer includes an optical component. The first spacer part and the second spacer part respectively have a tongue and a groove for an engagement with each other in a stacking direction of the optical layer stack.

CITATION LIST

Patent Literature

PTL 1: Japanese Unexamined Patent Application Publication (JP-A) No. 2010-266664
PTL 2: JP-A No. 2003-046825
PTL 3: JP-A No. 2006-313185
PTL 4: JP-A No. 2003-032525
PTL 5: JP-A No. 2015-180963

SUMMARY OF INVENTION

Technical Problem

However, the focal length (distance from a lens to an imager or photodetector) is predetermined for the sake of design in some lens modules, and the imaging unit disclosed in PTL 1 is not applicable to such an imaging device predetermined to have a long focal length, because the imaging unit includes the spacer with a low height. In addition, the imaging unit disclosed in PTL 1 has a small contact area between the spacer and the lens, and this causes hard adjustment of the horizontal position of the lens.

In contrast, the imaging device disclosed in PTL 2 and the lens module disclosed in PTL 3 are applicable to imaging devices that are predetermined to have long focal lengths. Such lenses as above, in which a lens functioning portion and a support are integral with each other and the support is long, are formable by integral molding, but, when formed by integral molding, suffer from low form accuracy even when formed by injection molding or imprint molding. This indicates that a lens having a long focal length is hard to be obtained if higher form accuracy is desired. In other words, high form accuracy and long focal length have not been compatible with each other.

The solid-state imaging device disclosed in PTL 4 is applicable even with a long focal length. The lens is secured to the lens holder, and the lens holder and the lens barrel enable the adjustment of the focal length. However, the adjustment of the focal length requires three parts, i.e., the lens holder, the lens barrel, and the lens, and thus requires a relatively large number of parts. In addition, the configuration (structure) as above causes hard adjustment of the horizontal position of the lens.

The optical layer stack disclosed in PTL 5 is applicable even with a long focal length. However, the spacer in this device is secured by engagement, and this causes hard adjustment of the horizontal position of the lens. In addition, the adjustment of the focal length requires three parts, i.e., the first layer, the first spacer, and the second spacer, and thus requires a relatively large number of parts.

Accordingly, the present invention has an object to provide a lens module for imaging devices (imaging-device lens module) which can employ a lens having high form accuracy even with a long focal length (distance between the lens and a photodetector), enables easy adjustment of the focal length with a small number of parts, and enables easy adjustment of the focal position (horizontal position of the lens functioning portion) before joining of the lens and the spacer with each other.

Solution to Problem

As a result of intensive investigations to achieve the object, the inventors of the present invention found that a specific lens module for imaging devices can employ a lens having high form accuracy even with a long focal length (distance between the lens and the photodetector), enables easy adjustment of the focal length with a small number of parts, and enables easy adjustment of the focal position (horizontal position of a lens functioning portion) before joining of the lens with the spacer. This lens module includes a lens, a substrate, and a spacer. The lens includes a functioning portion that functions as a lens, a non-functioning portion that is disposed around the periphery of, and is integral with, the functioning portion, and a support that is integral with the non-functioning portion and supports the lens. The substrate includes (equipped with) a photodetector. The spacer is disposed on the substrate around the photodetector, has a flat top face, and supports the lens by being bonded at the top face to a bottom face, which is flat, of the support of the lens. The top face of the spacer has a width greater than the width of the bottom face of the support. The support has a height L1, the spacer has a height L2, and the functioning portion has a diameter D, where the total of L1 and L2 is greater than D, and where D is equal to or greater than L1. The present invention has been made on the basis of these findings.

Specifically, the present invention provides a lens module for imaging devices (imaging-device lens module). This lens module includes a lens, a spacer, and a substrate including a photodetector. The lens includes a functioning portion, a non-functioning portion, and a support. The functioning portion functions as a lens. The non-functioning portion is disposed around the periphery of, and is integral with, the functioning portion. The support is integral with the non-functioning portion and supports the lens. The spacer is disposed on the substrate around the photodetector. The spacer has a flat top face, and the support of the lens has a flat bottom face. The spacer is bonded at the top face to the bottom face of the support of the lens to support the lens. The top face of the spacer has a width greater than the width of the bottom face of the support. The lens has a height L1 as a dimension from the support bottom face to the lowermost end of the non-functioning portion, the spacer has a height L2, and the functioning portion has a diameter D, where the total of L1 and L2 is greater than D, and where D is equal to or greater than L1.

The spacer is preferably disposed outside a space defined by an imaginary surface defined by connecting between the periphery of the functioning portion and the periphery of the photodetector; the bottom face of the functioning portion; and the top face of the substrate.

The spacer preferably has a tapered space in the central region.

The present invention also provides a method for producing the lens module for imaging devices. The method includes forming the lens and the spacer each by imprint molding.

Advantageous Effects of Invention

The lens module for imaging devices according to the present invention is applicable to imaging devices having long focal lengths, can employ a lens having high accuracy even at such a long focal length, enables easy adjustment of the focal length with a small number of parts, and enables easy adjustment of the focal position.

BRIEF DESCRIPTION OF DRAWINGS

FIG. 1 is a schematic view (vertical cross-sectional view) of an imaging-device lens module according to an embodiment of the present invention;

FIG. 2 is a top view of the imaging-device lens module according to the present invention illustrated in FIG. 1;

FIG. 3 is a perspective view of the imaging-device lens module according to the present invention illustrated in FIG. 1;

FIG. 4 is a schematic view (vertical cross-sectional view) of an imaging-device lens module according to another embodiment of the present invention;

FIG. 5 is a schematic view (vertical cross-sectional view) of an imaging-device lens module according to yet another embodiment of the present invention;

FIG. 6 is a schematic view (vertical cross-sectional view) of an imaging-device lens module according to still another embodiment of the present invention; and FIG. 7 is a schematic view (vertical cross-sectional view) of an imaging-device lens module according to another embodiment of the present invention.

DESCRIPTION OF EMBODIMENTS

Imaging-Device Lens Module

FIG. 1 is a schematic view (vertical cross-sectional view) of an embodiment of a lens module for imaging devices according to the present invention (hereinafter also simply referred to as a "lens module according to the present invention"). FIG. 2 is a top view of the lens module according to the present invention illustrated in FIG. 1. FIG. 3 is a perspective view of the lens module according to the present invention illustrated in FIG. 1. The lens module according to the present invention includes a lens 1, a spacer 2, and a substrate 3. The lens 1 is held by (placed on) the spacer 2. The spacer 2 is held by (placed on) the substrate 3. The substrate 3 includes a photodetector 3a.

The lens 1 includes a functioning portion 1a, a non-functioning portion 1b, and a support 1c. The functioning portion 1a functions as a lens. The non-functioning portion 1b is disposed around the periphery of, and is integral with, the functioning portion 1a. The support 1c is integral with the non-functioning portion 1b and supports the lens 1. The functioning portion 1a, which functions as a lens, has the function of condensing or gathering light to the photodetector and is positioned at the central region of the lens when viewed from above. The functioning portion 1a has, when viewed from above, a true circular shape, but may have another circular shape (such as an elliptic shape), or a polygonal shape (such as a triangular, square, or rectangular shape), where the shape viewed from above refers to a cross-sectional shape in a direction perpendicular to the optical axis of the functioning portion 1a, namely, is a cross-sectional shape in a horizontal direction. The functioning portion 1a has a convex shape (spherical shape) at both principal surfaces thereof. However, the functioning portion 1a has only to have a convex shape in at least the surface facing the photodetector 3a (lower side in FIG. 1), and may have any non-limiting shape at the opposite surface (upper side in FIG. 1). Namely, the opposite surface may have any of shapes such as a convex shape, concave shape, planar shape, and shapes corresponding to these shapes, except insofar that these shapes are humped in a cyclic manner at the outer periphery.

The non-functioning portion 1b is square when viewed from above, is disposed around the periphery of the functioning portion 1a, which is round when viewed from above, and is integral with the functioning portion 1a. The non-functioning portion 1b is provided not for the purpose of offering the function of condensing light to the photodetector, has approximately no lens function (imaging function or lens function for imaging system), or is not approximately involved in image pickup. The non-functioning portion 1b is not limited to the embodiment illustrated in FIG. 1 and has only to be integral with the functioning portion 1a, as long as extending toward outside of the center of the functioning portion 1a (outside the circle defined by the functioning portion 1a, which is round when viewed from above). For example, the non-functioning portion 1b may be planar as illustrated in FIG. 1, or may be convex or concave.

The support 1c is integral with the non-functioning portion 1b so as to extend in a downward direction from the entire periphery of the non-functioning portion 1b in such a shape that the central region of a rectangular solid is hollowed to have a circular truncated conical space. The support 1c supports the functioning portion 1a and the non-functioning portion 1b. The support 1c has a flat bottom face 1d (flat plane). As used herein, the term "downward direction" is not limited to a vertical downward direction, but also includes any direction which is inclined at an angle of less than 90° with the vertical downward direction. The support 1c may have a constant height in the entire periphery as illustrated in FIGS. 1 and 3, or may have portions differing in height regularly or irregularly over the periphery. The support 1c does not have to be disposed over the entire periphery of the non-functioning portion 1b. For example, the support 1c may be disposed as integral with the periphery of the non-functioning portion 1b regularly or irregularly.

The functioning portion 1a has a thickness of preferably 0.05 to 10 mm, more preferably 0.1 to 5 mm, furthermore preferably 0.2 to 1 mm, and particularly preferably 0.3 to 0.7 mm, where the thickness refers to the thickness of the thickest portion of the functioning portion 1a. The functioning portion 1a may have any diameter D not limited, but preferably 0.1 to 10 mm, more preferably 0.15 to 5 mm, furthermore preferably 0.2 to 3 mm, still more preferably 0.3 to 2.5 mm, and particularly preferably 0.4 to 2 mm. The diameter D refers to the length (dimension) of the longest portion of the functioning portion 1a when viewed from above.

The thickness of the non-functioning portion 1b is preferably equal to or less than the thickness of the functioning portion 1a and is typically preferably 0.05 to 8 mm, more preferably 0.08 to 4 mm, furthermore preferably 0.1 to 0.8 mm, and particularly preferably 0.2 to 0.5 mm. The non-functioning portion 1b has a width not limited, but preferably 0.1 to 10 mm, more preferably 0.2 to 5 mm, furthermore preferably 0.3 to 2 mm, and particularly preferably 0.35 to 1.5 mm, where the width refers to the shortest distance from the interface with the functioning portion 1a to the outer periphery of the non-functioning portion 1b.

The ratio of the width of the non-functioning portion 1b to the diameter D of the functioning portion 1a is typically from 0.1 to 1, preferably from 0.15 to 0.8, more preferably from 0.2 to 0.7, and furthermore preferably from 0.25 to 0.6.

The support 1c has a height L1 not limited, but preferably 0.03 to 10 mm, preferably 0.3 to 5 mm, and furthermore preferably 0.4 to 2 mm. The height L1 refers to the height (dimension) from the lowermost end of the bottom face 1d of the support 1c to the lowermost end of the non-functioning portion 1b in the lens 1.

The bottom face 1d of the support 1c has a width A not limited, but preferably 0.03 to 2 mm, more preferably 0.05 to 1 mm, and furthermore preferably 0.07 to 0.5 mm.

The lens 1 is preferably made from a plastic. Non-limiting examples of the plastic to form the lens 1 include olefinic resins, acrylic resins (such as methacrylic ester resins), styrenic resins (such as acrylonitrile-styrene copolymers, methyl methacrylate-styrene copolymers, and methyl methacrylate-modified acrylonitrile-butadiene-styrene copolymers (transparent ABS resins)), polycarbonate resins, polyamide resins (such as alicyclic polyamide resins), polyester resins, epoxy resins, and silicone resins. The plastic may be a thermoplastic resin or a curable resin (such as a thermosetting resin or photocurable resin). Examples of the curable resin include, but are not limited to, epoxy resins, acrylic resins, and silicone resins, of which epoxy resins are preferred. The lens 1 may be made from each of different resins alone or in combination.

The lens 1 may further include one or more additives, in addition to the plastic. Non-limiting examples of the additives include stabilizers (such as thermal stabilizers, ultraviolet absorbers, and antioxidants), plasticizers, lubricants, fillers, colorants, flame retardants, antistatic agents, laser light absorbents, and internal mold release agents. Examples of the internal mold release agents include, but are not limited to, known or common internal mold release agents such as fluorine-containing compounds, silicones, and stearates.

The plastic to form the lens 1 has a refractive index of preferably 1.4 to 1.7, more preferably 1.48 to 1.65, and furthermore preferably 1.5 to 1.6.

The plastic to form the lens 1 has a total luminous transmittance of preferably 80% or more (e.g., 80% to 99%), more preferably 85% or more (e.g., 85% to 98%), and furthermore preferably 90% or more (e.g., 90% to 95%).

The plastic to form the lens 1 has a thermal deformation temperature of typically 70° C. to 300° C., preferably 120° C. to 250° C., and more preferably 170° C. to 200° C.

The lens 1 can be produced by integrally molding or forming the functioning portion 1a, the non-functioning portion 1b, and the support 1c through a known or common molding technique. Examples of the molding technique include, but are not limited to, compression molding, transfer molding, extrusion molding, injection molding, and imprint molding techniques. Among them, imprint molding technique is preferred from the viewpoint of easy integral molding with high form accuracy. In other words, the lens 1 is preferably one formed by imprint molding.

The functioning portion 1a may have undergone, in at least one side thereof, any of various processings or treatments such as hard coat treatment, antireflection treatment, anti-fog treatment, anti-fouling treatment, and mirror treatment, alone or in combination.

The spacer 2 is disposed around the photodetector 3a on the substrate 3, which includes (is equipped with) the photodetector 3a. The spacer 2 has a flat top face (upper end face) 2a (flat plane), is bonded at the top face 2a to the bottom face (lower end face) 1d of the support 1c of the lens 1, thereby supports the lens 1, and is not in contact with the functioning portion 1a. Accordingly, the top face 2a of the spacer 2 and the bottom face 1d of the support 1c are joined with each other. The top face 2a and the bottom face 1d may be bonded through an adhesive layer, or may be bonded without the medium of an adhesive layer (namely, may be abut on each other). The spacer 2 and the support 1c are bonded to each other at their flat faces, as described above. This configuration can eliminate or minimize deviation in focal length and can offer high accuracy of focal length even when the focal length is long. The bonding of the two components, when performed through an adhesive layer, is preferably performed with the application of pressure so as to give flatter joining planes.

The spacer 2 has, in its central region, a tapered (circular truncated conical) space, where the space tapers upward along the optical axis direction of the functioning portion 1a. The tapered space as above can be easily formed in a stage prior to the formation of a through hole to allow light passed through the functioning portion 1a to pass through the space and contributes to the formation of the after-mentioned space S. The space, as being a tapered space, allows the top face 2a to have a larger area as compared with a cylindrical space. This allows the spacer 2 to more stably support the lens 1, allows the lens 1 before bonding to be more easily moved horizontally on the spacer 2, and thereby enables more easy adjustment of the horizontal position of the lens 1. A line segment 2b constituting a tapered cross section in the optical axis direction of the functioning portion 1a is a straight line, but may be a line curved partially or entirely. Namely, the "tapered" space also refers to and includes such a space that the line segment 2b is a curved line. The line segment 2b may include straight lines having different slopes in combination. Namely, the degree of tapering of the space may change in mid-course. The tapered space, when present, has only to taper approximately. For example, the tapered space may have such a shape that the top or bottom of the space is opened vertically, or opened so as to have a larger horizontal cross-sectional area (see, for example, FIG. 7). The shape of the spacer 2 is not limited to the shape having a tapered hollow space, but may be another shape such as a shape having a cylindrical hollow portion (hollow space). When viewed from above, the hollow space of the spacer 2 has a round shape (as a horizontal cross-sectional shape). However, the shape has only to correspond to the cross-sectional shape of the functioning portion 1a and may be any shape such as an elliptic shape or a polygonal shape (such as a triangular or quadrangular shape).

The spacer 2 has a diameter of typically 0.1 to 12 mm, preferably 0.3 to 8 mm, more preferably 0.5 to 4 mm, and furthermore preferably 0.8 to 3 mm. The diameter of the spacer 2 refers to the shortest dimension among dimensions (lengths) that pass through the center of the spacer 2 when viewed from above, and is identical to the length of one side of the spacer 2, which is square when viewed from above, in FIG. 1.

The top face 2a of the spacer 2 has a width B of typically 0.02 to 1 mm, preferably 0.05 to 0.5 mm, more preferably 0.07 to 0.3 mm, and furthermore preferably 0.1 to 0.2 mm.

The spacer 2 has a height L2 not limited, but preferably 0.1 to 3 mm, more preferably 0.3 to 2 mm, and furthermore preferably 0.5 to 1 mm. The height L2 refers to the height (dimension) from the lowermost end of the spacer 2 to the lowermost end of the top face 2a.

The spacer 2 is preferably made from a plastic. Non-limiting examples of the plastic to form the spacer 2 include polyamide resins (including aliphatic polyamide resins such as polyamide 6, polyamide 66, polyamide 12, polyamide 612, and polyamide 6/66; aromatic polyamide resins such as polyamide 6T; and alicyclic polyamide resins), polyester resins (such as poly(alkylene arylate) resins), polycarbonate resins, olefinic resins (exemplified by homo- or co-polymers (including elastomers) of chain olefins, such as polyethylenes, polypropylenes, ethylene-propylene copolymers, and ethylene-propylene rubber; and cyclic olefinic resins), styrenic resins, acrylic resins (such as methacrylic ester resins), vinyl resins (such as vinyl chloride resins, vinyl acetate resins, ethylene-vinyl acetate copolymers, poly(vinyl alcohol)s, and ethylene-vinyl alcohol copolymers), poly(phenylene oxide) resins (exemplified by poly(phenylene oxide)s, modified poly(phenylene oxide)s (such as blends with polystyrenes, and polystyrene-grafted poly(phenylene oxide))), epoxy resins, and silicone resins. The plastic may be a thermoplastic resin or a curable resin (such as a thermosetting resin or photocurable resin). Non-limiting examples of the curable resin include epoxy resins, acrylic resins, and silicone resins, of which epoxy resins are preferred. The plastic may be a crystalline resin or an amorphous resin. The spacer 2 may be made from each of these resins alone or in combination.

The spacer 2 may further include one or more additives, in addition to the plastic. Examples of the additives are as with those exemplified as additives which the lens 1 may include. The spacer 2 may include each of different additives alone or in combination. In particular, the spacer 2 may include a filler (generally an inorganic filler) from the viewpoint of holding the lens 1.

The spacer 2, which has the tapered space at the central region, can be produced typically by molding a material into a shape that has a circular truncated conical space at the central region, but does not have a through hole (opening hole), using a forming mold, and cutting out or punching the top of the circular truncated cone at the central region. Examples of the molding technique are as with those exemplified as the molding technique for the lens 1. Among them, imprint molding technique is preferred from the viewpoint of enabling easy molding with high form accuracy. In other words, the spacer 2 is preferably one formed by imprint molding.

The top face 2a of the spacer 2 is a flat plane, and the bottom face 1d of the support 1c of the lens 1 is also a flat plane. This configuration allows the lens 1 to be easily movable horizontally on the spacer 2 before joining, and thereby enables easy adjustment of the horizontal position of the lens 1. The top face 2a and the bottom face 1d, which serve as joint surfaces, have only to be parallel to each other and are preferably horizontal planes, but may be inclined planes.

At the joining plane (bonding face) between the spacer 2 and the support 1c, the top face 2a of the spacer 2 has a width B, and the bottom face 1d of the support 1c has a width A, where B is greater than A. Thus, the lens 1 is stably supported by the spacer 2. This configuration allows the lens 1 to be easily movable horizontally on the spacer 2 before joining and enables easy adjustment of the horizontal position of the lens 1. From a similar viewpoint, the top face 2a preferably has a larger area as compared with the bottom face 1d. In the comparison between the width A of the bottom face 1d of the support 1c and the width B of the top face 2a, the width A of the bottom face 1d, when having different widths at different positions, refers to the shortest width; and the width B of the top face 2a refers to the width at a position corresponding to the position with the width A of the bottom face 1d.

The spacer 2 is disposed outside a space S defined by: an imaginary surface defined by connecting between the periphery of the functioning portion 1a and the periphery of the photodetector 3a; the bottom face of the functioning portion 1a; and the top face of the substrate 3. The configuration as above of the lens module according to the present invention allows light entered the functioning portion 1a of the lens 1 to reach the photodetector 3a without being impeded by the spacer 2.

In the lens module according to the present invention, the lens 1 is not directly placed on the substrate 3, but is supported through the spacer 2 over the substrate 3. The lens module according to the present invention, as having the configuration as above, can employ a spacer 2 having an appropriate height and is applicable even with a long focal length. In addition, the lens module does not have to cause the support 1c of the lens 1 to have a larger length, because of using the spacer 2. Thus, the lens 1, which includes the functioning portion 1a, the non-functioning portion 1b, and the support 1c, can have high form accuracy even when integrally molded. The lens module can therefore employ a lens having high form accuracy even when the module is designed to have a long focal length. The lens module employs, as a lens, not a lens including only a functioning portion and a support, or including only a functioning portion and a non-functioning portion, but the lens 1, which integrally includes the functioning portion 1a, the non-functioning portion 1b, and the support 1c. The lens 1, when formed by integral molding, can serve as a lens having high form accuracy; and, as a result, the focal length can be easily adjusted with a minimum number of parts, i.e., only the lens 1 and the spacer 2, and the focal position can be easily adjusted.

Assume that the lens 1 has a height L1 as a dimension from the bottom face 1d of the support 1c to the lowermost end of the non-functioning portion 1b, the spacer 2 has a height L2, and the functioning portion 1a has a diameter D. In this case, the total of L1 and L2 (L1+L2) is greater than D, and D is equal to or greater than L1. In a conventional lens module devoid of members corresponding to the spacer 2, when to be applied to a device having a focal length longer than D, requires a greater height of a support of the lens so as to provide such a long focal length. However, it is difficult to form a lens having a height of the support greater than D by integral molding with high form accuracy. In contrast, the lens module according to the present invention enables integral molding of the lens with high form accuracy, even when to be applied to a focal length (L1+L2) greater than D. This is because the lens module employs the spacer 2, can thereby provide a long focal length using a lens including a support with a low height, and can employ a lens including a support with a height L1 smaller than D.

As described above, L1+L2 is greater than D, namely, these meet the condition: $(L1+L2)/D > 1.0$, preferably the condition: $(L1+L2)/D > 1.3$, and more preferably the condition: $(L1+L2)/D > 1.5$. These dimensions preferably meet the condition: $(L1+L2)/D \leq 2.0$.

The total of L1 and L2 (L1+L2) is not limited, but is preferably 0.5 to 20 mm, more preferably 0.7 to 5 mm, and furthermore preferably 1.1 to 1.5 mm.

The diameter D is equal to or greater than L1 as described above. Namely, L1 and D meet the condition $L1/D \leq 1.0$, preferably the condition: $L1/D \leq 0.8$, and more preferably the condition: $L1/D \leq 0.7$. These dimensions preferably meet the condition: $L1/D \geq 0.4$.

FIGS. 4 to 7 illustrate schematic views (vertical cross-sectional views) of other embodiments of the lens module according to the present invention. The lens module according to the present invention illustrated in FIG. 4 employs a lens 1 including a functioning portion 1a that has a convex surface at a side facing the photodetector 3a (lower side in FIG. 4), and a concave surface at the opposite side (upper side in FIG. 4). The spacer 2 in FIG. 1 has a tapered space that tapers upward at the central region along the optical axis direction of the functioning portion 1a; but the spacer 2 in FIG. 4 has a tapered space that tapers downward. Also in the embodiment illustrated in FIG. 4, the spacer 2 is disposed outside a space S defined by: an imaginary surface defined by connecting between the periphery of the functioning portion 1a and the periphery of the photodetector 3a; the bottom face of the functioning portion 1a; and the top face of the substrate 3. The other configurations are as with the lens module according to the present invention illustrated in FIG. 1.

The lens module according to the present invention illustrated in FIG. 5 employs, as a lens 1, the lens employed in the lens module according to the present invention illustrated in FIG. 1 (the lens whose functioning portion 1a is in a convex lens form); and employs, as a spacer 2, the spacer employed in the lens module according to the present invention illustrated in FIG. 4 (the spacer having, at the central region, a tapered space that tapers downward). The lens module according to the present invention illustrated in FIG. 6 employs, as a lens 1, the lens employed in the lens module according to the present invention illustrated in FIG. 4 (the lens whose functioning portion 1a has a convex shape at the side facing the photodetector 3a, and a concave shape at the opposite side); and employs, as a spacer 2, the spacer employed in the lens module according to the present invention illustrated in FIG. 1 (the spacer having, at the central region, a tapered space that tapers upward). The lens module according to the present invention illustrated in FIG. 7 corresponds to the lens module according to the present invention illustrated in FIG. 6, except for employing, as a spacer 2, a spacer that has a tapered space at the central region, in which the top of the tapered space is hollowed or opened so as to have a larger horizontal cross-sectional area.

The lens module according to the present invention may be housed (or cased). Such a housed lens module may be housed through the spacer 2 by a member capable of housing (such as a lens barrel), or the spacer 2 itself may function as a housing (such as a lens barrel).

The lens module according to the present invention is usable in a variety of equipment or devices to be equipped with an imaging-device lens module. Non-limiting examples of the equipment or devices include cameras, computers, word processors, printers, copying machines, facsimile machines, telephones, mobile devices (such as cellular phones, smartphones, game equipment, tablet computers and other personal digital assistants (PDAs)), automobile equipment, building-use equipment, and astronomical equipment. In particular, the lens modules are useful as lenses (what is more, high-precision lenses) for compact imaging devices, exemplified by lens modules for imaging devices such as compact cameras (e.g., cellular phone cameras (cameras of so-called camera-equipped cellular phones) and on-vehicle camera modules). The compact camera lenses as above may each have a width (or diameter) of about 10 mm or less.

Lens Module Production Method

The lens module according to the present invention can be produced by bonding or fastening the lens 1 and the spacer 2 to each other, and bonding or fastening the spacer 2 and the substrate 3 to each other, through a known or common technique. The bonding between the lens 1 and the spacer 2 can be performed typically by applying a photocurable adhesive to the bottom face 1d of the support 1c of the lens 1, or to the top face 2a of the spacer 2, laminating and compressively bonding the bottom face 1d and the top face 2a, and thereafter applying ultraviolet radiation to the faces to join the lens 1 and the spacer 2 to each other. Alternatively, the bonding may also be performed by bringing the bottom face 1d and the top face 2a into contact with each other through surface contact, and thermally fusing the contact area to join the lens 1 and the spacer 2 to each other. The bonding between the spacer 2 and the substrate 3 can be performed typically by bringing the bottom face of the spacer 2 into contact with the top face of the substrate 3, and bonding the contact area to join the spacer 2 and the substrate 3 to each other. The bonding between the lens 1 and the spacer 2 and the bonding between the spacer 2 and the substrate 3 may be performed in any sequence not limited.

The photocurable adhesive for use herein may be selected from known or common photocurable adhesives and is exemplified typically by adhesives including the photocurable resins aforementioned above. The photocurable adhesive may be applied to the bottom face 1d or the top face 2a entirely or partially. In a not-limiting example of embodiments where the photocurable adhesive is applied partially, the photocurable adhesive is applied only to the four corners of the square (square member) as illustrated in FIG. 2.

The bonding between the spacer 2 and the substrate 3 may be performed typically by using a known or common adhesive, or by heat sealing.

As a summary of the above description, the configurations according to embodiments of the present invention, as well as variations thereof, will be listed below as appendices.

(1) A lens module for imaging devices, the lens module including a lens, a spacer, and a substrate equipped with a photodetector, the lens including a functioning portion that functions as a lens; a non-functioning portion that is disposed around the periphery of, and is integral with, the functioning portion; and a support that is integral with the non-functioning portion and supports the lens, the spacer being disposed on the substrate around the photodetector, the spacer having a flat top face, the support of the lens having a flat bottom face, and the spacer being bonded at the top face to the bottom face of the support of the lens to support the lens, the top face of the spacer having a width greater than the width of the bottom face of the support, the lens having a height L1 as a dimension from the bottom face of the support to the lowermost end of the non-functioning portion, the spacer having a height L2, the functioning portion having a diameter D, where the total of L1 and L2 is greater than D, and where D is equal to or greater than L1.

(2) The imaging-device lens module according to (1), wherein the spacer is disposed outside a space defined by: an imaginary surface defined by connecting between the periphery of the functioning portion and the periphery of the photodetector; the bottom face of the functioning portion; and the top face of the substrate.

(3) The imaging-device lens module according to one of (1) and (2), wherein the spacer has a tapered space at the central region.

(4) The imaging-device lens module according to (3), wherein the tapered space has such a shape that the top or bottom of the space is opened vertically, or opened so as to have a larger horizontal cross-sectional area.

(5) The imaging-device lens module according to any one of (1) to (4), wherein the total of L1 and L2 (focal length) is 0.5 to 20 mm.

(6) The imaging-device lens module according to any one of (1) to (5), wherein the lens and the spacer is each independently made from an epoxy resin.

(7) The imaging-device lens module according to any one of (1) to (6), wherein the top face of the spacer and the bottom face of the support are horizontal planes.

(8) The imaging-device lens module according to any one of (1) to (7), wherein the top face of the spacer has an area larger than the area of the bottom face of the support.

(9) A method for producing the imaging-device lens module according to any one of (1) to (8), the method including forming the lens and the spacer each by imprint molding.

INDUSTRIAL APPLICABILITY

The lens modules according to the present invention are usable in a variety of equipment or devices to be equipped with an imaging-device lens module, where the equipment or devices are exemplified typically by cameras, computers, word processors, printers, copying machines, facsimile machines, telephones, mobile devices (such as cellular phones, smartphones, game equipment, tablet computers and other personal digital assistants (PDAs)), automobile equipment, building-use equipment, and astronomical equipment. In particular, the lens modules are useful as lenses (what is more, high-precision lenses) for compact imaging devices, exemplified by lens modules for imaging devices such as compact cameras (e.g., cellular phone cameras (cameras of so-called camera-equipped cellular phones) and on-vehicle camera modules).

REFERENCE SIGNS LIST 1 lens
1a functioning portion
1b non-functioning portion
1c support
1d bottom face of support 1c
2 spacer
2a top face of spacer 2
2b line segment constituting tapered cross section
3 substrate
3a photodetector
A width of bottom face 1d
B width of top face 2a
D diameter of functioning portion 1a
L1 height of support 1a
L2 height of spacer 2
S space defined by: imaginary surface defined by connecting between periphery of functioning portion 1a and periphery of photodetector 3a; bottom face of functioning portion 1a; and top face of substrate 3

The invention claimed is:

1. A lens module for imaging devices, comprising:
a lens;
a spacer; and
a substrate equipped with a photodetector,
the lens comprising:
  a functioning portion that functions as a lens;
  a non-functioning portion that is disposed around the periphery of the functioning portion and is integral with the functioning portion; and
  a support that is integral with the non-functioning portion and supports the lens,
the spacer being disposed on the substrate around the photodetector, the spacer having a flat top face, the support of the lens having a flat bottom face, and the spacer being bonded at the top face to the bottom face of the support of the lens to support the lens, the top face of the spacer having a width greater than a width of the bottom face of the support, the lens having a height L1 as a dimension from the bottom face of the support to a lowermost end of the non-functioning portion, the spacer having a height L2, the functioning portion having a diameter D, where the total of L1 and L2 is greater than D, and where D is equal to or greater than L1, wherein L1, L2, and D meet the condition $(L1+L2)/D>1.3$.

2. The lens module according to claim 1, wherein the spacer is disposed outside a space defined by:

an imaginary surface defined by connecting between the periphery of the functioning portion and a periphery of the photodetector;

a bottom face of the functioning portion; and a top face of the substrate.

3. The lens module according to claim 2, wherein the total of L1 and L2 is 0.5 to 20 mm.

4. The lens module according to claim 2, wherein the spacer has a tapered space in a central region.

5. The lens module according to claim 4, wherein the top face of the spacer has an area larger than the area of the bottom face of the support.

6. The lens module according to claim 1, wherein the spacer has a tapered space in a central region.

7. The lens module according to claim 6, wherein the tapered space has such a shape that the top or bottom of the space is opened vertically, or opened so as to have a larger horizontal cross-sectional area.

8. The lens module according to claim 6, wherein the total of L1 and L2 is 0.5 to 20 mm.

9. The lens module according to claim 8, wherein the top face of the spacer has an area larger than the area of the bottom face of the support.

10. A method for producing the lens module according to claim 1, the method comprising forming the lens and the spacer each by imprint molding.

11. The method for producing the lens module according to claim 10, wherein the lens is produced by integrally molding or forming the functioning portion, the non-functioning portion, and the support.

12. The lens module according to claim 1, wherein the total of L1 and L2 is 0.5 to 20 mm.

13. The lens module according to claim 1, wherein the lens and the spacer is each independently made from an epoxy resin.

14. The lens module according to claim 1, wherein the top face of the spacer and the bottom face of the support are horizontal planes.

15. The lens module according to claim 1, wherein the top face of the spacer has an area larger than the area of the bottom face of the support.

16. The lens module according to claim 1, wherein L1 and D meet the condition $L1/D \leq 0.8$.

17. A lens module for imaging devices, comprising:

a lens;

a spacer; and a substrate equipped with a photodetector, the lens comprising:

a functioning portion that functions as a lens;

a non-functioning portion that is disposed around the periphery of the functioning portion and is integral with the functioning portion; and a support that is integral with the non-functioning portion and supports the lens, the spacer being disposed on the substrate around the photodetector, the spacer having a flat top face, the support of the lens having a flat bottom face, and the spacer being bonded at the top face to the bottom face of the support of the lens to support the lens, the top face of the spacer having a width greater than a width of the bottom face of the support, the lens having a height L1 as a dimension from the bottom face of the support to a lowermost end of the non-functioning portion, the spacer having a height L2, the functioning portion having a diameter D, where the total of L1 and L2 is greater than D, and where D is equal to or greater than L1, wherein the spacer is disposed outside a space defined by:

an imaginary surface defined by connecting between the periphery of the functioning portion and a periphery of the photodetector;

a bottom face of the functioning portion; and a top face of the substrate, the spacer has a tapered space in a central region, and the tapered space having such a shape that the top or bottom of the space is opened vertically, or opened so as to have a larger horizontal cross-sectional area, the total of L1 and L2 is 0.5 to 20 mm, L1, L2, and D meet the condition $(L1+L2)/D>1.3$, L1 and D meet the condition $L1/D \leq 0.8$, the lens and the spacer is each independently made from an epoxy resin, the top face of the spacer and the bottom face of the support are horizontal planes, and the top face of the spacer has an area larger than the area of the bottom face of the support.

* * * * *